United States Patent
Tkachuk et al.

(10) Patent No.: US 8,402,319 B2
(45) Date of Patent: Mar. 19, 2013

(54) METHOD AND SYSTEM TO EXTRACT A NAVIGATION MODEL FOR ANALYSIS OF A WEB APPLICATION

(75) Inventors: Oksana Tkachuk, Palo Alto, CA (US); Sreeranga P. Rajan, Sunnyvale, CA (US)

(73) Assignee: Fujitsu Limited, Kawasaki-shi (JP)

( * ) Notice: Subject to any disclaimer, the term of this patent is extended or adjusted under 35 U.S.C. 154(b) by 349 days.

(21) Appl. No.: 12/895,323

(22) Filed: Sep. 30, 2010

(65) Prior Publication Data

US 2012/0084609 A1 Apr. 5, 2012

(51) Int. Cl.
*G06F 11/00* (2006.01)
(52) U.S. Cl. ..................................... 714/38.1
(58) Field of Classification Search .......... 714/38–38.03
See application file for complete search history.

(56) References Cited

U.S. PATENT DOCUMENTS

| | | | |
|---|---|---|---|
| 7,600,014 B2 | 10/2009 | Russell et al. | 709/224 |
| 2003/0093717 A1* | 5/2003 | Mason | 714/38 |
| 2004/0205774 A1 | 10/2004 | Goodwin et al. | 719/318 |
| 2008/0172258 A1 | 7/2008 | Weger et al. | 705/4 |
| 2009/0089810 A1 | 4/2009 | Tkachuk | |
| 2010/0293557 A1 | 11/2010 | Tkachuk et al. | 719/318 |
| 2012/0030516 A1* | 2/2012 | De Keukelaere et al. | 714/38.1 |

OTHER PUBLICATIONS

Response to Non-final Office Action for U.S. Appl. No. 12/751,982, Jun. 29, 2012.
Non-final Office Action for U.S. Appl. No. 12/751,982, Mar. 29, 2012.
Dwyer, M. et al., "Patterns in Property Specifications for Finite-State Verification," *Proceedings of the 21st International Conference on Software Engineering*, May 1999.
Welcome to Junit.org!, http://junit.org, downloaded Oct. 7, 2010.
JwebUnit—JwebUnit, http://jwebunit.sourceforge.net/articles.html, downloaded Oct. 7, 2010.
Thinking Inside a Biggar Box, "In-Process Web Integration Tests with Jetty and JwebUnit", http://johannesbrodwall.com/2006/12/10/in-process-web-integration-tests-with-jetty-and-jwebunit/, downloaded Oct. 7, 2010.
JSR 168 and JSR 286 Portlet Development Blog—News, Articles, Tutorial . . . , http://portletwork.blogspot.com/2007/08/testing-portlets-with-jetty-pluto-and.html, downloaded Oct. 7, 2010.

(Continued)

*Primary Examiner* — Bryce Bonzo
(74) *Attorney, Agent, or Firm* — Baker Botts L.L.P.

(57) ABSTRACT

In one embodiment, a method includes automated extraction of the Page Transition Graph (PTG) model for model-based analysis of web applications. Specifically, the method includes accessing one or more JAVASERVER PAGES (JSP) files, one or more Extensible Markup Language (XML) configuration files, and one or more class files of a web application; parsing the JSP files and extracting data in the JSP files that encode user or server events supported by the event-driven application; parsing the XML configuration files and extracting data in the XML configuration files that encode definitions used by the event-driven application when deployed; parsing the class files and extracting data in the class files that encode one or more actions or one or more forms used by the event-driven application when deployed; storing the extracted data as an abstract syntax tree (AST); populating a page transition graph (PTG) of the event-driven application based on the AST; and checking the extracted PTG for navigation errors such as unreachable pages, ghost pages and undefined transitions.

20 Claims, 5 Drawing Sheets

OTHER PUBLICATIONS

JwebUnit—Frequently Asked Questions, http://jwebunit.sourceforge.net/faq.html#javascript-support, downloaded Oct. 7, 2010.

JwebUnit—Building JwebUnit with Maven 2, http://jwebunit.sourceforge.net/building-maven.html, downloaded Oct. 7, 2010.

JwebUnit—How to Contribute to JwebUnit, http://jwebunit.sourceforge.net/how-to-contribute.html, downloaded Oct. 7, 2010.

How-To Release JwebUnit with Maven 2, http://jwebunit.sourceforge.net/how-to-release.html, downloaded Oct. 7, 2010.

JwebUnit—JwebUnit Welcome, http://jwebunit.sourceforge.net/index.html, downloaded Oct. 7, 2010.

A. Kubo, et al., "Automatic extraction and verification of page transitions in a web application," *APSEC '07: Proceedings of the 14th Asia-Pacific Software Engineering Conference*, 3, IEEE Computer Society, 2007.

Memom, A. et al., "GUI ripping: Reverse engineering of graphical user interfaces for testing," *WCRE '03: Proceedings of the 10th Working Conference on Reverse Engineering*, IEEE Computer Society, 2003.

Mesbah A. et al., "Invariant-based automatic testing of ajax user interfaces," *Proceedings of the 31st International Conference on Software Engineering (ICSE'09), Research Papers*. IEEE Computer Society, 2009.

Rajan, S. P. et al., "Weave: Web applications validation environment," *Proceeding B of the 31st International Conference on Software Engineering*, May 2009.

Ricca, F. et al., Analysis and testing of web applications, *ICSE '01: Proceedings of the 23rd International Conference on Software Engineering*, IEEE Computer Society, 2001.

Rice, D. *"Geekonomics: The Real Cost of Insecure Software" Book*, 2007.

Selenium Documentation, http://seleniumhq.org/docs, downloaded Oct. 7, 2010.

Introducing Selenium—Selenium Documentation, http://seleniumhq.org/docs/01_introducing_selenium.html, downloaded Oct. 7, 2010.

Selenium Basics—Selenium Documentation, http://seleniumhq.org/docs/02_selenium_basics.html, downloaded Oct. 7, 2010.

Selenium-IDE—Selenium Documentation, http://seleniumhq.org/docs.03_selenium_ide.html, downloaded Oct. 7, 2010.

Selenium Commands—Selenium Documentation, http://seleniumhq.org/docs/04_selenese_commands.html, downloaded Oct. 7, 2010.

Selenium-RC, http://seleniumhq.org/docs/05_selenium_rc.html, downloaded Oct. 7, 2010.

Test Design ConsIDerations_Selenium Decumentation, http://seleniumhq.org/docs/06_test_design_considerations.html, downloaded Oct. 7, 2010.

Selenium Grid—How it Works, http://selenium-grid.seleniumhq.org/how_it_works.html, downloaded Oct. 7, 2010.

User-Extensions—Selenium Documentation, http://seleniumhq.org/docs/08_user_extensions.html, downloaded Oct. 7, 2010.

Selenium 2.0 and Web Driver—Selenium Documentation, http://selenumhq.org/docs/09_webdriver.html, downloaded Oct. 7, 2010.

.Net client driver configuration—Selenium Documentation, http://seleniumhq.org/docs/appendix_installing_dotnet_driver_client.html, downloaded Oct. 7, 2010.

Java Client Driver Configuration—Selenium Documentation, http://seleniumhq.org/docs/appendix_installing_java_driver_client.html, downloaded Oct. 7, 2010.

Python Client Driver Configuration—Selenium Documentation, http://seleniumhq.org/docs/appendix_installing_python_driver_client.html, downloaded Oct. 7, 2010.

Locating Techniques—Selenium Documentation, http://seleniumhq.org/docs/appendix_locating_techniques.html, downloaded Oct. 7, 2010.

How Selenium Works, http://seleniumhq.org/about/how.html, downloaded Oct. 7, 2010.

Selenium IDE Plugins, http://seleniumhq.org/projects/ide/, downloaded Oct. 7, 2010.

Selenium Remote-Control, http://selenimhq.org/projects/remote-control/, downloaded Oct. 7, 2010.

Selenium Grid, http://selenium-grid.seleniumhq.org/, downloaded Oct. 7, 2010.

Selic, B. "Tutorial: An overview of uml 2.0," IC*SE '04: Proceedings of the 26th International Conference on Software Engineering*, pp. 741-742, IEEE Computer Society, 2004.

J2EE v1.4 Downloads, http://www.oracle.com/technetwork/java/javaee/download-141771.html, downloaded Oct. 7, 2010.

Sprenkle, S. et al., "Automated replay and failure detection for web applications," *ASE '05: Proceedings of the 20th IEEE/ACM international Conference on Automated software engineering*, 2005.

Cloud Application Platform for Spring—Java SpringSource, http://www.springsource.com/, downloaded Oct. 7, 2010.

VMware vFabric Cloud Application Platform SpringSource, http://www.springsource.com/products/cloud-application-platform, downloaded Oct. 7, 2010.

Unmatched Performance Management for Virtualized Java Apps SpringSource, http://www.springsource.com/hyperic44, downloaded Oct. 7, 2010.

Using Spring Insight, http://static.springsource.com/projects/tc-server/2.0/devedition/htmlsingle/devedition.html, downloaded Oct. 7, 2010.

Steven, J. et al., jrapture: A capture/replay tool for observation-based testing. *SIGSOFT Software Eng. Notes*, 25(5):158--167, 2000.

Stoller, S.D. et al., "Transformations for model checking distributed java programs," *Proc. 8th Int'l. SPIN Workshop on Model Checking of Software*, vol. 2057 of *Lecture Notes in Computer Science*, May 2001.

SUN. JavaServer Pages. http://java.sun.com/products/jsp/index.jsp, downloaded Oct. 7, 2010.

JavaServer Pages Technology—Frequently Asked Questions, http://java.sun.com/products/jsp/faq.html, downloaded Oct. 7, 2010.

JavaServer Pages [tm] Technology—White Paper, http://java.sun.com/products/jsp/whitepaper.html, downloaded Oct. 7, 2010.

JavaServer Pages [tm] Technology—JavaServer Pages Servlet Developer White Paper, http://java.sun.com/products/jsp/jsp-developerwp.html, downloaded Oct. 7, 2010.

JavaServer Pages[tm] Technology—JavaServer Pages White Papers, http://java.sun.com/products/jsp/jspguide-wp.html, downloaded Oct. 7, 2010.

JavaServer Pages[tm] Technology—JavaServer Pages Comparing Methods for Server-Side Dynamic Content White Papers, http://java.sun.com/products/jsp/jspservlet.html, downloaded Oct. 7, 2010.

JavaServer Pages[tm] (JSP[tm]) Syntax Version 2.0, http://java.sun.com/products/jsp/syntax/2.0/card20.pdf, downloaded Oct. 7, 2010.

JavaServer Pages[tm] (JSP[tm]) Syntax Version 1.2, http://java.sun.com/products/jsp/syntax/1.2/card12.pdf, downloaded Oct. 7, 2010.

Tkachuk, O., "Bandera Environment Generator Website," http://beg.projects.cis.ksu.edu, downloaded Oct. 7, 2010.

Using BEG, Bandera Environment Generator, http://beg.projects.cis.ksu.edu/using.html, downloaded Oct. 7, 2010.

About BEG, Bandera Environment Generator, http://beg.projects.cis.ksu.edu/papers/ase04.pdf dwyer analyzing article, downloaded Oct. 7, 2010.

About Bandera, http://bandera.projects.cis.ksu.edu/, downloaded Oct. 7, 2010.

Bogor Website, About Bogor, http://bogor.projects.cis.ksu.edu/, downloaded Oct. 7, 2010.

Anand, S. et al., "JPF—SE: A Symbolic Execution Extension to Java PathFinder", College of Computing, Georgia Institute of Technology, Moffett Field, CA, 2007.

Tkachuk, Oksana, "Adapting Side Effects Analysis for Modular Program Model Checking," *ESEC/FSE'03, ACM*, 2003.

Tkachuk, O. et al., "Application of automated environment generation to commercial software," *ISSTA '06: Proceedings of the 2006 international symposium on Software testing and analysis*, pp. 203-214, 2006.

Tkachuk, O. et al., "Automated environment generation for software model checking," *Proceedings of the 18th IEEE International Conference on Automated Software Engineering*, Oct. 2003.

Tkachuk, O. et al.,"Environment generation for validating event-driven software using model checking," *IET Softw.*, vol. 4, Iss. 3, 2010.

Yu, F. et al., "Modular verification of web services using efficient symbolic encoding and summarization," *SIGSOFT '08/FSE•16: Proceedings of the 16th ACM SIGSOFT International Symposium an Foundations of software engineering*, pp. 192-202, 2008.

Beck, Kent et al., JUnit Cookbook, file://E:\cookbook.htm, downloaded Oct. 7, 2010.

Mesbah, A. et al., "A Component-and Push-Based Architectural Style for AJAX Applications", The Journal of Systems and Software, Delft University of Technology, Software Engineering Research Group, Mekeiweg, The Netherlands, 2008.

Dwyer, Matthew B. et al., "Analyzing Interaction Orderings with Model Checking", ASE '04, Proceedings of the 19th IEEE International Conference on Automated Software Engineering, IEEE Computer Society, Washington, DC, USA, 2004.

JUnit 4.6, Sunnary of Changes in Version 4.6, file://E:\README.html, downloaded Oct. 7, 2010.

Junit 4 in 60 Seconds at Cavdar.net, http://www.cavdar.net/2008/07/21/junit-4-in-60-seconds/, downloaded Oct. 7, 2010.

JUnit: A Cook's Tour, file://E:\cookstour.htm, downloaded Oct. 7, 2010.

JUnit FAQ, file://E:\faq.htm, downloaded Oct. 7, 2010.

JUnit, file://E:\homepage.html, downloaded Oct. 7, 2010.

JUnit Test Infected: Programmers Love Writing Tests, file://E:\testing.htm, downloaded Oct. 7, 2010.

JwebUnit—Articles, http://jwebunit.sourceforge.net/articles.html, downloaded Oct. 7, 2010.

Loh, Dr. Allan et al., "Generating Web Applications from Use Case Scenarios", Proceedings of the 2004 Australian Software Engineering Conference (ASWEC'04), Department of Computing, Curtin University of Technology, Perth, Australia, 2004.

Summary of Changes in Version 4.5, file://E:\ReleaseNotes4.4.html, downloaded Oct. 7, 2010.

Summary of Changes in Version 4.6, file://E:\ReleaseNotes4.6.html, downloaded Oct. 7, 2010.

Summary of Changes in Version 4.7, file://E:\ReleaseNotes4.7.html, downloaded Oct. 7, 2010.

Summary of Changes in Version 4.8.1, file://E:\ReleaseNotes4.8.1html, downloaded Oct. 7, 2010.

Summary of Changes in Version 4.8.2, file://E:\ReleaseNotes4.8.2.html, downloaded Oct. 7, 2010.

Summary of Changes in Version 4.9, file://E:\ReleaseNotes4.9.html, downloaded Oct. 7, 2010.

Summary of Changes in Version 4.8, file://E:ReleaseNotes4.8.html, downloaded Oct. 7, 2010.

Yuen, S. et al., "Web automata: A behavioral model of web applications based on the mvc model," *Information and Media Technologies*, 1(1):66-79, 2006.

European Search Report for EP 10161423.8, Dec. 13, 2010.

Loh, A. et al., "Generating web applications from use case scenarios", *Software Engineering Conference*, Apr. 13, 2004.

Mesbah, A. et al., "A component- and push-based architectural style for ajax applications", *Journal of Systems & Software*, 81(12), Dec. 1, 2008.

Mesbah, A. et al., "Invariant-based automatic testing of AJAX user interfaces", *IEEE 31st International Conference on Software Engineering*, May 16, 2009.

Apache Struts—Key Technologies Primer, http://struts.apache.org/primer.html, downloaded Oct. 7, 2010.

About Apache Struts 2, http://struts.apache.org/2.2.1/index.html, downloaded Oct. 7, 2010.

Welcome to Struts 1, http://struts.apache.org/2.0.14/index.html, downloaded Oct. 7, 2010.

About Apache Struts 2, http://struts.apache.org/1.3.10/index.html, downloaded Oct. 7, 2010.

Barlas, E. et al., "NetStub, A framework for verification of distributed java applications," *ASE '07: Proceedings of the twenty-second IEEE/ACM international conference on Automated software engineering*, 2007.

Barrett, C. et al., "CVC Lite: A new implementation of the cooperating validity checker," *Proceedings of the 16th International Conference on Computer Aided Verification, CAV*, Jul. 2004.

Brat, G. et al., "Java PathFinder—a second generation of a Java model-checker," *Proceedings of the Workshop on Advances in Verification*, Jul. 2000.

Clarke, E. M. et al., "Automatic Verification of Finite State Concurrent Systems using Temporal Logic Specifications," *ACM transactions on Programming Languages and Systems*, 8(2):244-263, Apr. 1986.

Deutsch, A. et al., "Verification of communicating data-driven web services," *PODS*, pp. 90-99, 2006.

\* cited by examiner

FIG. 1

FIG. 2
```
//from index.jsp
<logic:redirect forward=welcome

//from welcome.jsp
<html:link page="/Welcome.do">
    <font color="white">Home</font></html:link>
<html:link page="/pages/user/userRegister.jsp">
    <font color="white">Register</font></html:link>
<html:link page="/pages/user/userlogin.jsp">
    <font color="white">Login</font></html:link>

//from userlogin.jsp
<html:form action="/userlogin" method="post">

//from loginsuccess.jsp
if(userid==null)
    response.sendRedirect("../userlogin.jsp)
```

FIG. 3
```
//links
LINK_TAG = <html:link;<c:url;<s:url
LINK_TAG_ATTRIB = href
//forms (actions)
FORM_TAG = <html:form;<s:form
//redirects
REDIRECT_TAG = <logic:redirect;<jsp:forward
REDIRECT_SCRIPTLET = response.sendRedirect
//includes
INCLUDE_TAG = <jsp:include;<jsp:param
INCLUDE_SCRIPTLET = include
```

FIG. 4
```
//from web.xml
<servlet-mapping>
    <servlet-name>action</servlet-name>
    <url-pattern>*.do</url-pattern>
</servlet-mapping>
<welcome-file-list>
    <welcome-file>index.jsp</welcome-file>
</welcome-file-list>
//from struts-config.xml
<action mappings>
...
<action
    path="/Welcome"
    forward="/pages/Welcome.jsp"/>
</action>
<action
    path="/userlogin"
    name="UserLoginForm"
    type="roseindia.web.struts.action.UserLoginAction">
    <forward name="success" path="loginsuccess.jsp"/>
    <forward name="failure" path="userlogin.jsp"/>
</action>
</action-mappings>
```

Input: *AST*: set of AST pages, definitions
Output: *PTG*: *Initially*: *PTG* = ∅
```
 1: for each ASTPage ap ∈ AST.getPages() do
 2:     Page p = gen(ap)
 3:     PTG.add(p)
 4: end for
 5: for each ASTPage ap ∈ AST.getPages() do
 6:     for each ASTEvent ae ∈ ap.getEvents() do
 7:         Page p = lookupPage(PTG, ap)
 8:         Event e = gen(ae)
 9:         Path path = ae.getPath()
10:         if isPage(path) then
11:             Page nextP = lookupPage(PTG, path)
12:             if nextP == null then
13:                 nextP = new Page(path)
14:                 nextP.ghost = true
15:             end if
16:             e.nextPage = nextP
17:         else
18:             ASTDef def = lookupDef(AST, path)
19:             if d == null then
20:                 e.nextPage = Undefined
21:             else
22:                 gen(e, def)
23:             end if
24:         end if
25:         p.add(e)
26:     end for
27: end for
28: return PTG
```

METHOD AND SYSTEM TO EXTRACT A NAVIGATION MODEL FOR ANALYSIS OF A WEB APPLICATION

TECHNICAL FIELD

This disclosure relates generally to analyzing web applications.

BACKGROUND

Quality assurance for applications—particularly applications with graphical user interfaces (GUIs) or ones designed for use in connection with the World Wide Web—is increasingly important. These applications are often difficult to test because they have large sets of possible user inputs. Current approaches to testing these applications include live-subject testing, capture-replay, unit testing, crawling, and model-based testing. Live-subject testing and capture-replay approaches involve considerable manual work and require a tester to step through a set of use-case scenarios while clicking on buttons and links and entering data into forms displayed through an interface, such as a web browser supporting a web application. While these applications are often designed to constrain and guide a user through a set of scenarios, the set of all possible user inputs may be too large for manual testing. Unit test cases are generally designed to validate or analyze one user event at a time and do not adequately address the validation or analysis of sequences of user events. Crawling techniques are typically designed to visit web pages automatically. However, without user guidance (such as, for example, the specification of user inputs), crawlers may be unable to visit all possible pages of a web or other event-driven application. Model-based approaches generally rely on user specifications.

DESCRIPTION OF EXAMPLE EMBODIMENTS

To analyze a web application it may be necessary to create (1) a driver to exercise the behavior of the web application and (2) stubs to simulate components that the web application may use but are out of the scope of the analysis. For example, a driver may simulate user actions with respect to the web application and stubs may simulate a database used by the web application. Particular embodiments may generate a driver for a web application by employing a technique that involves (1) specifying an application-specific Page Transition Graph (PTG) model, with nodes corresponding to possible pages of the web application, transitions corresponding to possible user and server events (such as, for example, the selection of links or buttons on those pages), event handlers, and user data; and (2) using an application-independent driver to traverse the application-specific PTG and generate sequences of user or server events allowed by the application-specific PTG. This technique may facilitate the validation or analysis of navigation and business-logic requirements of a web application. As an example and not by way of limitation, U.S. patent application Ser. No. 12/751,982, filed 31 Mar. 2010, entitled GENERATING A DRIVER FOR ANALYSIS OF AN EVENT-DRIVEN APPLICATION, which is incorporated herein by reference for example purposes only and not by way of limitation, discloses a method that includes specifying an application-specific navigation model of an event-driven application; analyzing the navigation model with respect to one or more navigation requirements of the event-driven application to determine whether the event-driven application satisfies the navigation requirements; generating one or more drivers for the event-driven application based on the navigation model; and traversing the navigation model with the application-independent event drivers to analyze the event-driven application with respect to one or more business-logic requirements of the event-driven application to determine whether the event-driven application satisfies the business-logic requirements.

Particular embodiments substantially automate the process of generating a driver by extracting the PTG specification from the implementation of the web application using static analysis. Particular embodiments automate PTG extraction for JAVA-based web applications that encode their page transitions using JAVA SERVERPAGES (JSP) and Extensible Markup Language (XML) files. APACHE STRUTS (or STRUTS)-based applications are an example of applications in this domain. There are two editions of STRUTS: STRUTS1 and STRUTS2. Herein, reference to STRUTS encompasses STRUTS1, STRUTS2, or both, and vice versa, where appropriate. Although this disclosure describes and illustrates STRUTS-based applications, this disclosure contemplates any suitable web applications. Herein, reference to a web application encompasses any suitable event-driven application, where applicable.

STRUTS is an open-source framework based on a Model-View-Controller (MVC) design pattern. The view portion is commonly represented by JSP, which combine static information (e.g., HTML, XML) with dynamic information (e.g., JAVA as part of one or more JSP scriptlets). In particular embodiments, the controller is represented by the STRUTS servlet controller, which intercepts incoming user requests and sends them to appropriate event-handlers, according to action mappings information specified in the XML descriptor file usually called struts-config.xml. In STRUTS, the request handling classes are subclassed from the Action class in the org.apache.struts.action package. Their event-handling method is called execute ( ). Actions encapsulate calls to business logic classes, interpret the outcome, and dispatch control to the appropriate view component to create the response. Form population is supported by the ActionForm class, which facilitates storing and validating user data.

Figure 1:
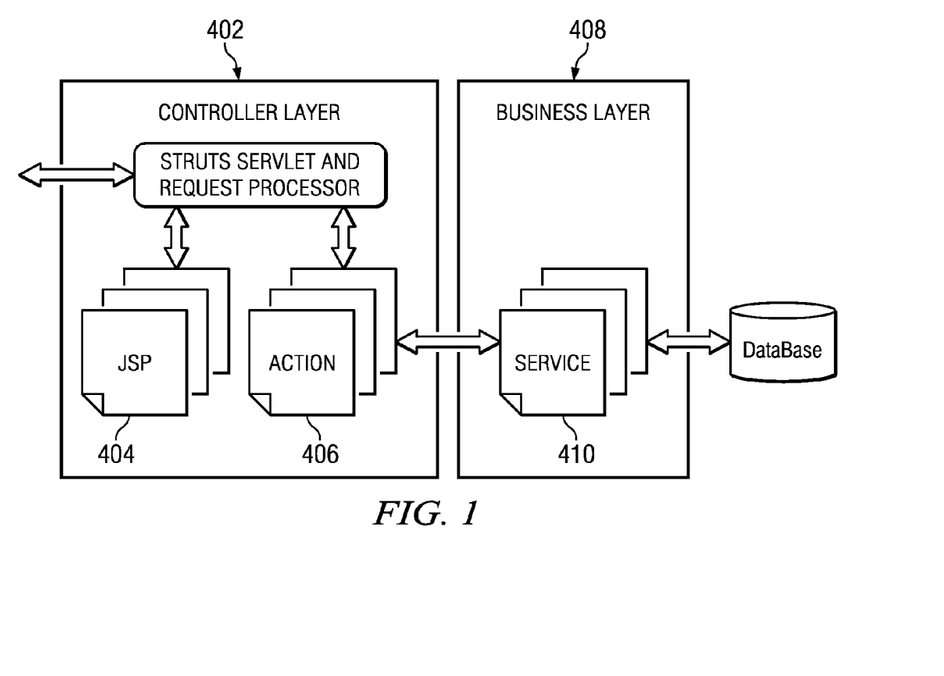
FIG. 1 illustrates an example data flow for an example web application.

FIG. 1 illustrates an example data flow for an example web application, which may be a STRUTS-based application. The data flow generally alternates between: (1) view to action (e.g., when a user clicks on a link or submits a form 404 (which may be represented by JSP), controller layer 402 receives the request, looks up the mapping, and forwards to an appropriate action 406, which calls business layer 408); and (2) action to view, (e.g., after the call to underlying service 410 returns, action 406 forwards to a resource in the view layer and a page is displayed in a web browser.

To demonstrate this, consider the following example, called Registration. Registration allows users to register and login to their accounts, followed by a logout. Registration encodes its page transitions using two XML files (web.xml and struts-congif.xml) and six JSP pages: index.jsp (the initial page, marked in the web.xml configuration file); welcome.jsp; userlogin.jsp; loginsuccess.jsp; userRegister.jsp; and registerSuccess.jsp. The event-handling part of Registration contains four Action classes and two ActionForm objects.

Figure 2:
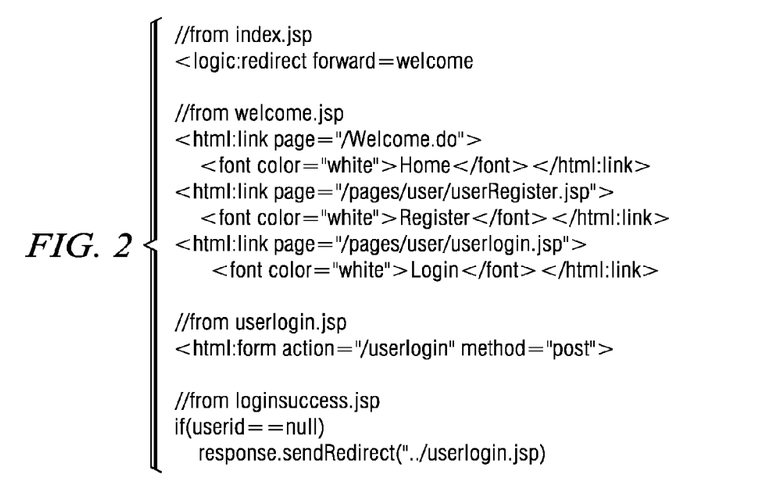
FIG. 2 illustrates example encodings of example user or server events in an example web application.

In particular embodiments, PTG extraction has two steps: (1) parsing JSP, XML, and JAVA files, mining relevant information from them, and storing the information in a convenient form, such as an Abstract Syntax Tree (AST); and (2) building a PTG based on the mined information. In particular embodiments, the parsing step mines information from (1) JSP files, (2) XML configuration files, and (3) class files that encode Action classes and ActionForm objects. These steps may occur in any suitable order, as each step may take an empty or partially populated AST and update it based on the information available at that step. In particular embodiments, the JSP mining step parses all JSP files of the web application. Each JSP page corresponds to a Page node in the AST. Each JSP file is scanned for information about possible user and server events, encoded statically in JSP. FIG. 2 shows encodings of example user or server events on the pages of Registration. In Registration, index.jsp redirects to welcome; the welcome.jsp page contains links back to itself, to userRegister.jsp, and to userlogin.jsp; the userlogin.jsp page contains a reference to the /userlogin action; and loginsuccess.jsp contains a redirect to another page.

Figure 3:
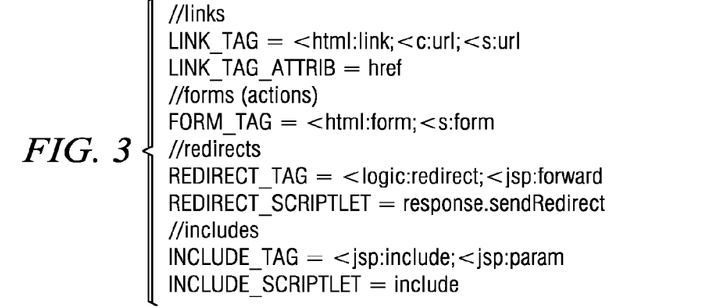
FIG. 3 illustrates example references to example user or server events in an example web application.

In particular embodiments, to find references to possible user and server events, the parsers need to know the types of encoding to track. FIG. 3 illustrates example references (or encodings) to example user or server events in an example web application. They include link and form JSP/HTML tags and attributes, redirect tags and scriptlet keywords to track redirect, and inclusion relationships (e.g., one JSP page can include another and display forms and links available on the included page). These encodings allow the parsers to find references to possible user and server events and store them as part of AST Event nodes. Each AST Event stores information about its path, which may be a reference to a next JSP page or an action, defined in the XML configuration files. When the path refers to a URL or a file not related to a PTG (e.g., an image), the parsers may filter out such events based on the naming conventions.

Figure 4:
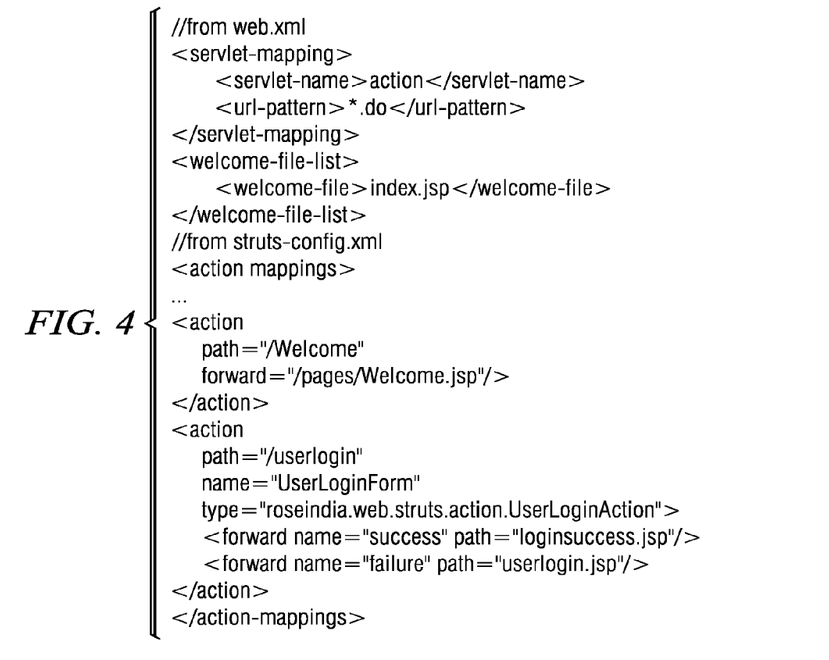
FIG. 4 illustrates example snippets of files containing example definitions used by an example web application when deployed.

In particular embodiments, XML configuration files contain various definitions needed at deployment time. For example, web.xml may contain information about naming conventions and initial pages, whereas struts-config.xml may contain action definitions. FIG. 4 illustrates example snippets of files containing example definitions used by Registration when deployed. The web.xml file specifies that index.jsp is the initial page. Under url-pattern definitions, .do is used as a suffix when referencing some actions. This information is used to match the reference to Welcome.do with its definition Welcome, available in struts-config.xml. In particular embodiments, the following describes at least in part the definition of the /userlogin action, referenced on the userlogin.jsp page: (1) this is the form submission event, taking UserLoginForm; (2) an event-handler of type UserLoginAction handles it; and (3) the outcome of this event depends on whether the event handling code returns "success" or "failure." In the case of "success," the next page is loginsuccess.jsp. In the case of "failure," the next page is userlogin.jsp. In this particular case, the path of each outcome references a JSP page. In general, it may reference another definition, available in this or another XML configuration file.

In particular embodiments, the XML parsers parse and store all the XML information as part of AST Definitions. Definitions describing form submission events require additional data, used to populate ActionForm objects. This information can be mined from several sources, including ActionForm classes themselves.

In particular embodiments, a next step finds and loads all ActionForm classes of the web application. For each application form, e.g., UserLoginForm, it loads its class file and, using reflection APIs, finds all its fields, e.g., userid and password. Using naming conventions, each field can be set through a field-specific setter method. For example, setUserid (String) sets the userid field and setPassword (String) sets the password field. Thus, after discovering field names, particular embodiments can generate code that sets these fields to values that represent user values entered into the corresponding text fields. To generate user values, this step may rely on values specified in a file, e.g., based on symbolic execution that supports strings. In the absence of specifications, in particular embodiments, this step may generate default values, e.g., common corner cases such as empty or non-empty strings.

Figure 5:
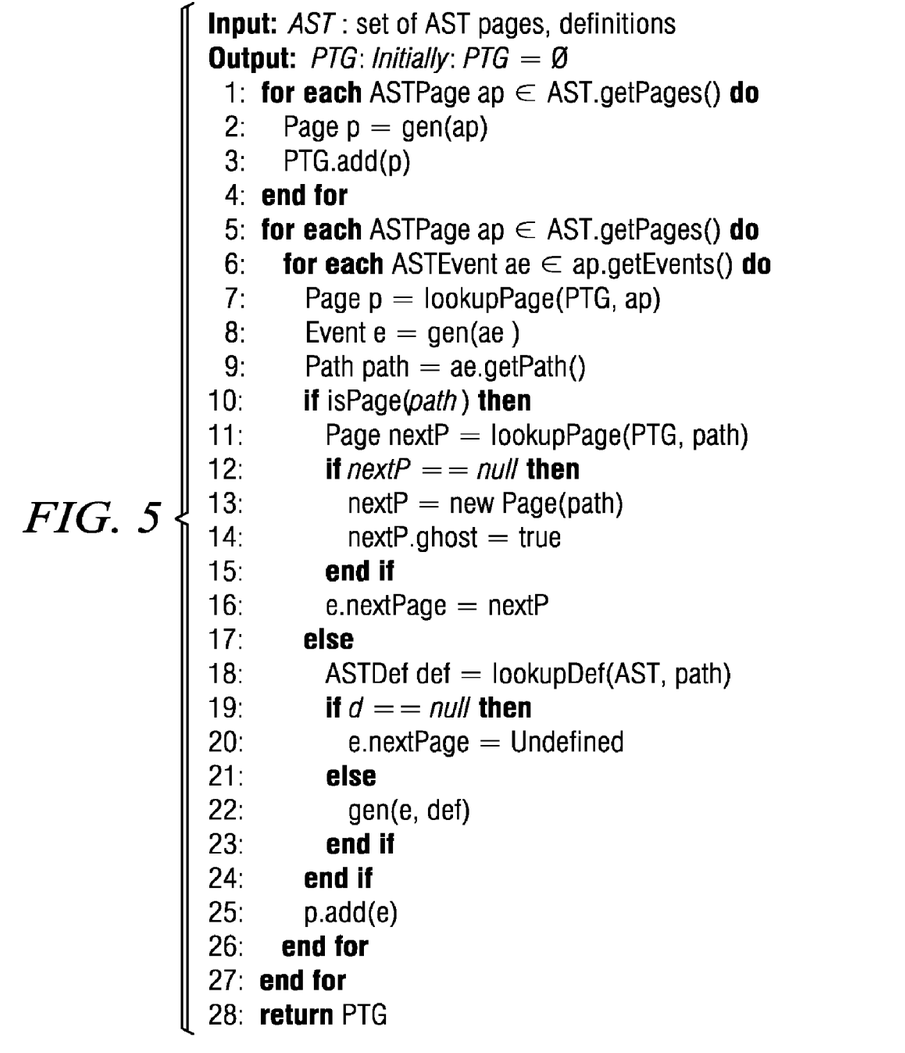
FIG. 5 illustrates an example algorithm for constructing an example page transition graph (PTG).

After the parsing step, the PTG construction step takes the AST, containing information about all JSP pages, their possible user and server events, and available XML definitions, and populates the PTG. FIG. 5 illustrates an example algorithm for constructing an example PTG. For each AST Page, the algorithm creates a PTG Page (Lines 1-4). Then, for each reference to the user or server event available on each AST page (Line 6), the algorithm resolves the reference, based on the encoded path of the event. If the path references a JSP page (Line 10), then a lookup mechanism is invoked to find that page (Line 11). If the page is not found, a new ghost page (a page that is referenced but does not exist) is created and set as a destination page of the event (Lines 12-14). If the path does not reference a JSP page, then it is looked up under the definitions (Line 18). If the definition is not found, the next page of the event is set to the special Undefined ghost page (Line 20) and the transition corresponding to this event is marked as an undefined transition. Otherwise, the definition is used to resolve the possible destination pages of the event (Line 22). Each definition updates the event according to its domain-specific encoding, e.g., the Action definitions from struts-config.xml generate EventHandler objects according to the type information and calculate destination pages according to the information encoded in forwards. This part of the algorithm is recursive, since a definition may reference other definitions. After the event construction is finished, the event is added to its source page (Line 25).

Figure 6:
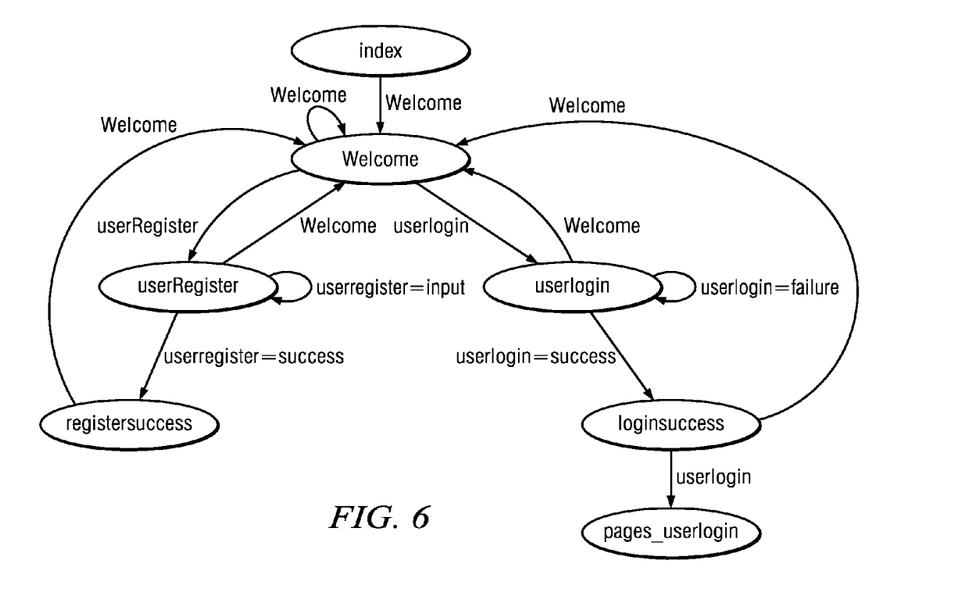
FIG. 6 illustrates an example visualization of an example PTG.

In particular embodiments, by construction, the approach extracts an overapproximation of the page transitions with respect to static JSP and XML encodings specified to the PTG generator. FIG. 6 illustrates an example visualization of an example page-transition portion of an example PTG extracted for Registration. The initial node is index. The node pages_userlogin is a ghost node. In particular embodiments, this node would be calculated when processing the response.sendRedirect ( ) event available on the loginsuccess.jsp page. This event refers to the " . . . /userlogin.jsp" page, which does not exist; the correct path is userlogin.jsp. When accessing the loginsuccess.jsp page directly, the server throws an exception with "the requested resource not available" message. In particular embodiments, such errors may appear after refactoring or due to typos and are difficult to find using traditional testing techniques.

Figure 7:
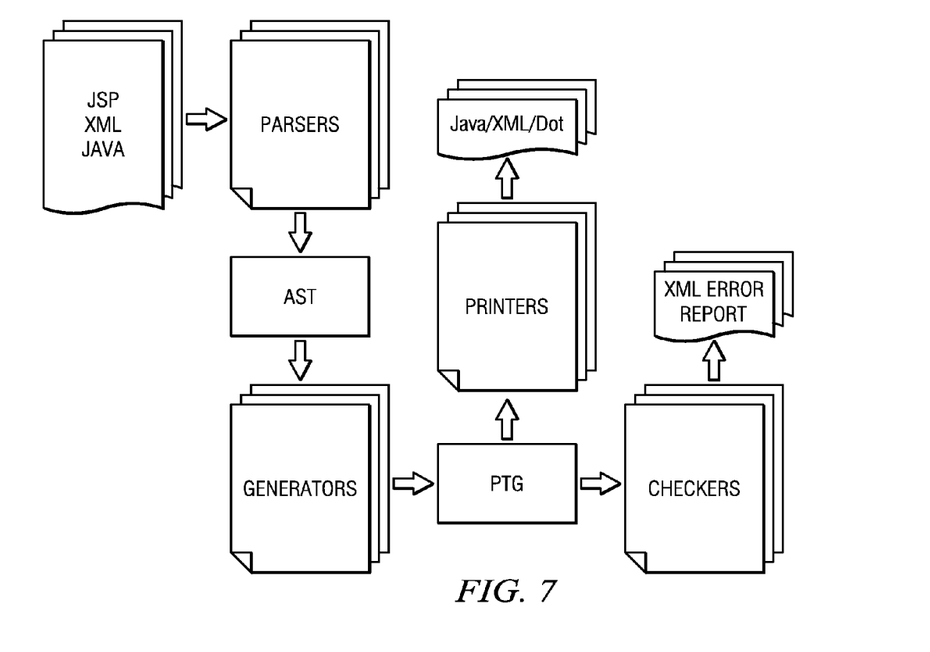
FIG. 7 illustrates an example architecture of an example PTG generator.

FIG. 7 illustrates an example architecture of an example PTG generator. Particular embodiments may implement one or more of the components of the architecture as hardware, software, or a combination of hardware or software. The PTG generator includes parsers, generators, printers, and checkers. In particular embodiments, the parsers are JSP parsers automatically generated by JavaCC based on the grammar capable of parsing JSP/HTML/XML tags, scriptlet blocks, and various types of comments. The JSP parser extracts information based on tags specified in a separate file (similar to the one in FIG. 3). In particular embodiments, there may be additional tags, based on domain-specific encodings. XML parsers may be based on the Digester framework. Given the AST, generators populate the PTG data structure. The PTG data structure may be implemented using the ECLIPSE MODELING FRAMEWORK (EMF). EMF supports model specification using JAVA interfaces. Given JAVA interfaces, EMF automatically generates their implementation and provides additional facilities, such as writing the model in XML and loading it from XML to JAVA. The PTG APIs may be used as a library. Particular embodiments may implement two generators: one that populates all elements of the PTG and one that populates only pages and transitions. The latter may be used for light-weight analysis of navigation requirements. Given the populated PTG, printers generate its various representations. FIG. 7 shows support for PTG generation in Java (which may be used by the PTG-based driver), XML (which may be used to populate page and event names for property specifications or other requirements), and the Dot representation (which may be used for visualization). Given a populated PTG, checkers collect features that may signal possible errors (e.g., unreachable and ghost pages and undefined transitions). The checkers print their output in XML. As part of diagnostics, the XML checker reports may also contain information about the sources of potential errors (e.g., mappings back to file names and line numbers of the PTG page/transition origins). Although this disclosure describes and illustrates a particular architecture of a PTG generator with particular components in a particular arrangement, this disclosure contemplates any suitable PTG generator with any suitable components in any suitable arrangement.

Figure 8:
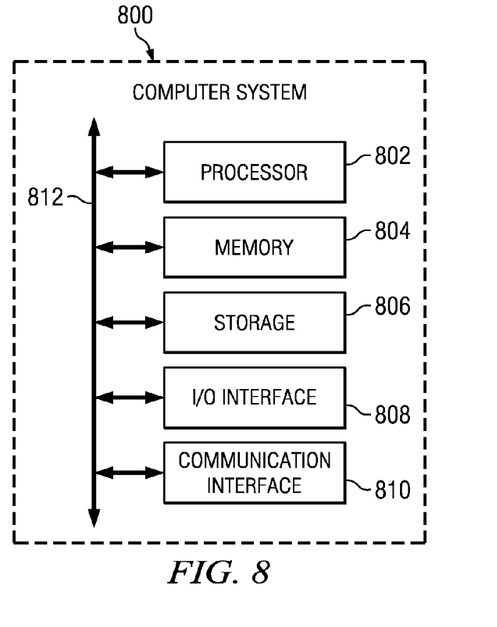
FIG. 8 illustrates an example computer system.

Particular embodiments may be implemented on one or more computer systems. FIG. 8 illustrates an example computer system 800. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 800 may include one or more computer systems 800; be unitary or distributed; span multiple locations; span multiple machines; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include an HDD, a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of processor 802 (such as, for example, one or more internal registers or caches), one or more portions of memory 804, one or more portions of storage 806, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA. In particular embodiments, software is expressed in HyperText Markup Language (HTML), Extensible Markup Language (XML), or other suitable markup language.

Figure 9:
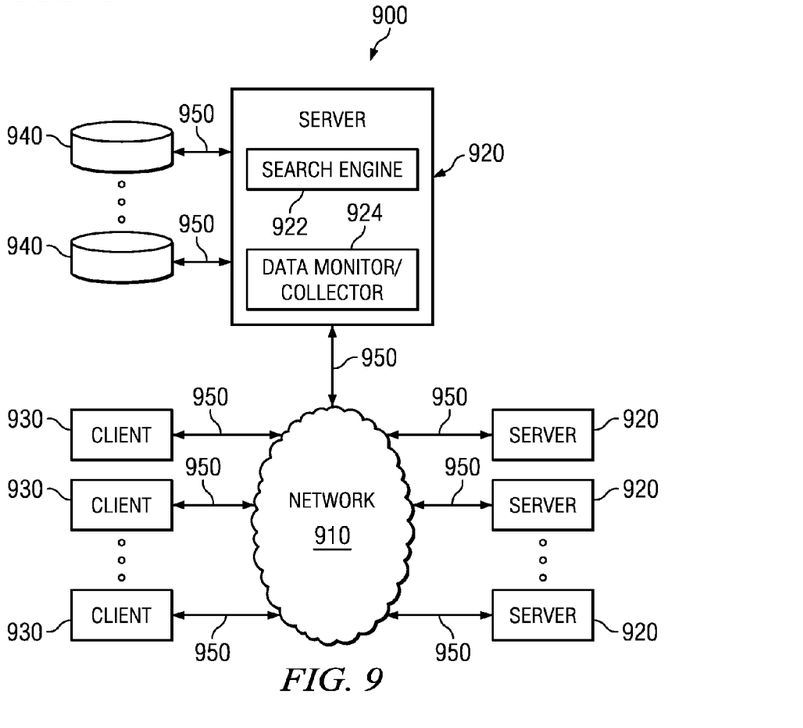
FIG. 9 illustrates an example network environment.

FIG. 9 illustrates an example network environment 900. Particular embodiments may perform one or more steps of one or more methods described or illustrated herein in network environment 900. In particular embodiments, one or more elements of network environment 900 provide functionality described or illustrated herein. Particular embodiments include one or more portions of network environment 900.

Network environment 900 includes a network 910 coupling one or more servers 920 and one or more clients 930 to each other. In particular embodiments, network 910 is an intranet, an extranet, a virtual private network (VPN), a LAN, a wireless LAN (WLAN), a WAN, a MAN, a communications network, a satellite network, a portion of the Internet, or another network 910 or a combination of two or more such networks 910. This disclosure contemplates any suitable network 910.

One or more links 950 couple servers 920 or clients 930 to network 910. In particular embodiments, one or more links 950 each includes one or more wired, wireless, or optical links 950. In particular embodiments, one or more links 950 each includes an intranet, an extranet, a VPN, a LAN, a WLAN, a WAN, a MAN, a communications network, a satellite network, a portion of the Internet, or another link 950 or a combination of two or more such links 950. This disclosure contemplates any suitable links 950 coupling servers 920 and clients 930 to network 910.

In particular embodiments, each server 920 may be a unitary server or may be a distributed server spanning multiple computers or multiple datacenters. Servers 920 may be of various types, such as, for example and without limitation, web server, news server, mail server, message server, advertising server, file server, application server, exchange server, database server, or proxy server. In particular embodiments, each server 920 may include hardware, software, or embedded logic components or a combination of two or more such components for carrying out the appropriate functionalities implemented or supported by server 920. For example, a web server is generally capable of hosting websites containing web pages or particular elements of web pages. More specifically, a web server may host HTML files or other file types, or may dynamically create or constitute files upon a request, and communicate them to clients 930 in response to HTTP or other requests from clients 930. A mail server is generally capable of providing electronic mail services to various clients 930. A database server is generally capable of providing an interface for managing data stored in one or more data stores.

In particular embodiments, each client 930 may be an electronic device including hardware, software, or embedded logic components or a combination of two or more such components and capable of carrying out the appropriate functionalities implemented or supported by client 930. For example and without limitation, a client 930 may be a desktop computer system, a notebook computer system, a netbook computer system, a handheld electronic device, or a mobile telephone. A client 930 may enable a network user at client 930 to access network 910. A client 930 may have a web browser, such as Microsoft Internet Explorer or Mozilla Firefox, and may have one or more add-ons, plug-ins, or other extensions, such as Google Toolbar or Yahoo Toolbar. A client 930 may enable its user to communicate with other users at other clients 930. This disclosure contemplates any suitable clients 930.

In particular embodiments, one or more data storages 940 may be communicatively linked to one or more servers 920 via one or more links 950. In particular embodiments, data storages 940 may be used to store various types of information. In particular embodiments, the information stored in data storages 940 may be organized according to specific data structures. Particular embodiments may provide interfaces that enable servers 920 or clients 930 to manage (e.g., retrieve, modify, add, or delete) the information stored in data storage 940.

In particular embodiments, a server 920 may include a search engine 922. Search engine 922 may include hardware, software, or embedded logic components or a combination of two or more such components for carrying out the appropriate functionalities implemented or supported by search engine 922. For example and without limitation, search engine 922 may implement one or more search algorithms that may be used to identify network resources in response to the search queries received at search engine 922, one or more ranking algorithms that may be used to rank the identified network resources, one or more summarization algorithms that may be used to summarize the identified network resources, and so on. The ranking algorithms implemented by search engine 922 may be trained using the set of the training data constructed from pairs of search query and clicked URL.

In particular embodiments, a server 920 may also include a data monitor/collector 924. Data monitor/collection 924 may include hardware, software, or embedded logic components or a combination of two or more such components for carrying out the appropriate functionalities implemented or supported by data collector/collector 924. For example and without limitation, data monitor/collector 924 may monitor and collect network traffic data at server 920 and store the collected network traffic data in one or more data storage 940. The pairs of search query and clicked URL may then be extracted from the network traffic data.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising, by one or more computer systems:
    accessing one or more JAVASERVER PAGES (JSP) files, one or more Extensible Markup Language (XML) configuration files, and one or more class files of an event-driven application;
    parsing the JSP files, wherein parsing the JSP files comprises extracting data from the JSP files that encode user or server events supported by the event-driven application;
    parsing the XML configuration files, wherein parsing the XML configuration files comprises extracting data from the XML configuration files that encode definitions used by the event-driven application when deployed;
    parsing the class files, wherein parsing the class files comprises extracting data from the class files that encode one or more actions or one or more forms used by the event-driven application when deployed;
    storing the extracted data as an abstract syntax tree (AST);
    populating a page transition graph (PTG) of the event-driven application based on the AST; and
    checking the PTG for navigation errors in the event-driven application.

2. The method of claim 1, wherein the navigation errors comprise one or more of:
    one or more unreachable pages;
    one or more ghost pages; or
    one or more undefined transitions.

3. The method of claim 1, wherein the event-driven application is a web application.

4. The method of claim 1, wherein the event-driven application is a STRUTS-based web application.

5. The method of claim 1, wherein the PTG when populated encodes:
    one or more pages of the event-driven application;
    one or more ghost pages of the event-driven application;
    one or more of the user or server events supported by the event-driven application;
    one or more user or server events that are referenced but not defined;
    one or more event handlers for processing one or more of the user or server events; and
    one or more event data for one or more of the user or server events.

6. One or more computer-readable non-transitory storage media embodying software that is operable when executed to:
    access one or more JAVASERVER PAGES (JSP) files, one or more Extensible Markup Language (XML) configuration files, and one or more class files of an event-driven application;
    parse the JSP files, wherein parsing the JSP files comprises extracting data from the JSP files that encode user or server events supported by the event-driven application;
    parse the XML configuration files, wherein parsing the XML configuration files comprises extracting data from the XML configuration files that encode definitions used by the event-driven application when deployed;
    parse the class files, wherein parsing the class files comprises extracting data from the class files that encode one or more actions or one or more forms used by the event-driven application when deployed;
    store the extracted data as an abstract syntax tree (AST);
    populate a page transition graph (PTG) of the event-driven application based on the AST; and
    check the PTG for navigation errors in the event-driven application.

7. The media of claim 6, wherein the navigation errors comprise one or more of:
    one or more unreachable pages;
    one or more ghost pages; or
    one or more undefined transitions.

8. The media of claim 6, wherein the event-driven application is a web application.

9. The media of claim 6, wherein the event-driven application is a STRUTS-based web application.

10. The media of claim 6, wherein the PTG when populated encodes:
    one or more pages of the event-driven application;
    one or more ghost pages of the event-driven application;
    one or more of the user or server events supported by the event-driven application;
    one or more user or server events that are referenced but not defined;
    one or more event handlers for processing one or more of the user or server events; and
    one or more event data for one or more of the user or server events.

11. An apparatus comprising:
    a memory comprising instructions executable by one or more processors; and
    one or more processors coupled to the memory and operable to execute the instructions, the one or more processors being operable when executing the instructions to:
        access one or more JAVASERVER PAGES (JSP) files, one or more Extensible Markup Language (XML) configuration files, and one or more class files of an event-driven application;

parse the JSP files, wherein parsing the JSP files comprises extracting data from the JSP files that encode user or server events supported by the event-driven application;

parse the XML configuration files, wherein parsing the XML configuration files comprises extracting data from the XML configuration files that encode definitions used by the event-driven application when deployed;

parse the class files, wherein parsing the class files comprises extracting data from the class files that encode one or more actions or one or more forms used by the event-driven application when deployed;

store the extracted data as an abstract syntax tree (AST);

populate a page transition graph (PTG) of the event-driven application based on the AST; and check the PTG for navigation errors in the event-driven application.

12. The apparatus of claim 11, wherein the navigation errors comprise one or more of:
one or more unreachable pages;
one or more ghost pages; or
one or more undefined transitions.

13. The apparatus of claim 11, wherein the event-driven application is a web application.

14. The apparatus of claim 11, wherein the event-driven application is a STRUTS-based web application.

15. The apparatus of claim 11, wherein the PTG when populated encodes:
one or more pages of the event-driven application;
one or more ghost pages of the event-driven application;
one or more of the user or server events supported by the event-driven application;
one or more user or server events that are referenced but not defined;
one or more event handlers for processing one or more of the user or server events; and
one or more event data for one or more of the user or server events.

16. A system comprising:
means for accessing one or more JAVASERVER PAGES (JSP) files, one or more Extensible Markup Language (XML) configuration files, and one or more class files of an event-driven application;

means for parsing the JSP files, wherein parsing the JSP files comprises extracting data from the JSP files that encode user or server events supported by the event-driven application;

means for parsing the XML configuration files, wherein parsing the XML configuration files comprises extracting data from the XML configuration files that encode definitions used by the event-driven application when deployed;

means for parsing the class files, wherein parsing the class files comprises extracting data from the class files that encode one or more actions or one or more forms used by the event-driven application when deployed;

means for storing the extracted data as an abstract syntax tree (AST);

means for populating a page transition graph (PTG) of the event-driven application based on the AST; and means for checking the PTG for navigation errors in the event-driven application.

17. The system of claim 16, wherein the navigation errors comprise one or more of:
one or more unreachable pages;
one or more ghost pages; or
one or more undefined transitions.

18. The system of claim 16, wherein the event-driven application is a web application.

19. The system of claim 16, wherein the event-driven application is a STRUTS-based web application.

20. The system of claim 16, wherein the PTG when populated encodes:
one or more pages of the event-driven application;
one or more ghost pages of the event-driven application;
one or more of the user or server events supported by the event-driven application;
one or more user or server events that are referenced but not defined;
one or more event handlers for processing one or more of the user or server events; and
one or more event data for one or more of the user or server events.

* * * * *